US010260691B2

(12) United States Patent
Ono et al.

(10) Patent No.: US 10,260,691 B2
(45) Date of Patent: Apr. 16, 2019

(54) ILLUMINATION APPARATUS

(71) Applicant: MAXELL, LTD., Kyoto (JP)

(72) Inventors: Chohei Ono, Osaka (JP); Kazuomi Kaneko, Ibaraki (JP); Nobuyuki Kaku, Osaka (JP)

(73) Assignee: Maxell, Ltd., Kyoto (JP)

( * ) Notice: Subject to any disclaimer, the term of this patent is extended or adjusted under 35 U.S.C. 154(b) by 20 days.

(21) Appl. No.: 15/539,243

(22) PCT Filed: Dec. 26, 2014

(86) PCT No.: PCT/JP2014/084696
§ 371 (c)(1),
(2) Date: Jun. 23, 2017

(87) PCT Pub. No.: WO2016/103512
PCT Pub. Date: Jun. 30, 2016

(65) Prior Publication Data
US 2017/0350566 A1    Dec. 7, 2017

(51) Int. Cl.
*F21S 8/00*    (2006.01)
*F21S 8/04*    (2006.01)
(Continued)

(52) U.S. Cl.
CPC .............. *F21S 8/06* (2013.01); *F21S 8/033* (2013.01); *F21S 8/04* (2013.01); *G03B 21/2033* (2013.01); *F21V 23/04* (2013.01); *F21Y 2115/10* (2016.08); *G03B 21/008* (2013.01); *G03B 21/16* (2013.01); *G03B 21/56* (2013.01)

(58) Field of Classification Search
CPC .......... F21S 8/06; F21S 8/033; G03B 21/2033
See application file for complete search history.

(56) References Cited

U.S. PATENT DOCUMENTS

2014/0098303 A1    4/2014 Kasuga

FOREIGN PATENT DOCUMENTS

JP          07-264527 A    10/1995
JP          09-139905 A    5/1997
(Continued)

OTHER PUBLICATIONS

International Search Report of PCT/JP2014/084696 dated Apr. 7, 2015.

*Primary Examiner* — Mary Ellen Bowman
(74) *Attorney, Agent, or Firm* — Mattingly & Malur, PC

(57) ABSTRACT

An illumination device configured to emit illumination light has a light source arranged inside a housing generating the illumination light; a diffusing panel attached to the housing; and a projector arranged inside a space formed by the housing and a part of the diffusing panel for projecting an image onto a projection surface. An optical unit is arranged so that an incident direction of a light flux incident from a display element provided in the projector onto a projection optical system of the projector is substantially vertical or in a direction closer to a vertical direction than a direction parallel to a horizontal plane, or so that an optical axis of the projection optical system on which the light flux from the display element provided in the projector is incident is substantially vertical or in a direction closer to the vertical direction than the direction parallel to the horizontal plane.

12 Claims, 21 Drawing Sheets

(51) Int. Cl.
*F21S 8/06* (2006.01)
*F21V 23/04* (2006.01)
*G03B 21/00* (2006.01)
*G03B 21/16* (2006.01)
*G03B 21/20* (2006.01)
*G03B 21/56* (2006.01)
*F21Y 115/10* (2016.01)

(56) References Cited

FOREIGN PATENT DOCUMENTS

| | | | |
|---|---|---|---|
| JP | 11-144510 A | | 5/1999 |
| JP | 11144510 A | * | 5/1999 |
| JP | 2003-016831 A | | 1/2003 |
| JP | 2004-037918 A | | 2/2004 |
| JP | 2004-078150 A | | 3/2004 |
| JP | 2004-184768 A | | 7/2004 |
| JP | 2004-233692 A | | 8/2004 |
| JP | 2004-336615 A | | 11/2004 |
| JP | 2006-086024 A | | 3/2006 |
| JP | 2006-162832 A | | 6/2006 |
| JP | 2007-027072 A | | 2/2007 |
| JP | 2007027072 A | * | 2/2007 |
| JP | 2008-077979 A | | 4/2008 |
| JP | 2008077979 A | * | 4/2008 |
| JP | 2008-185757 A | | 8/2008 |
| JP | 2009-145526 A | | 7/2009 |
| JP | 2012-186118 A | | 9/2012 |
| JP | 2012186118 A | * | 9/2012 |
| JP | 2014-120400 A | | 6/2014 |
| JP | 2014120400 A | * | 6/2014 |

* cited by examiner

FIG. 9
(A)
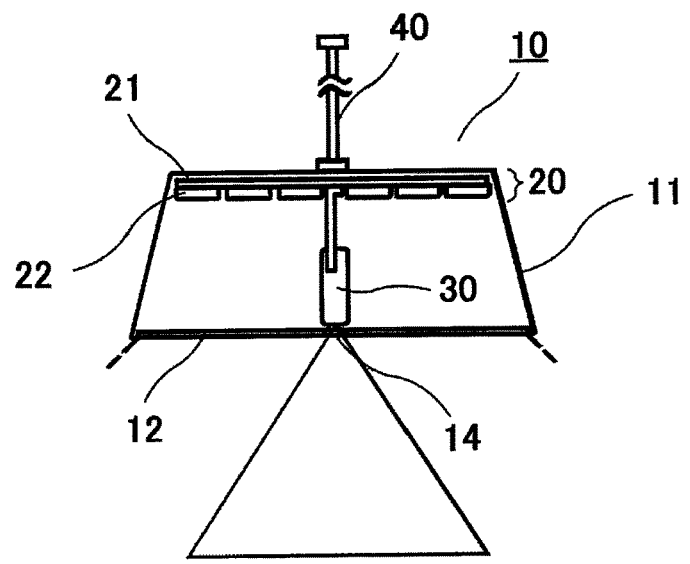
(B)
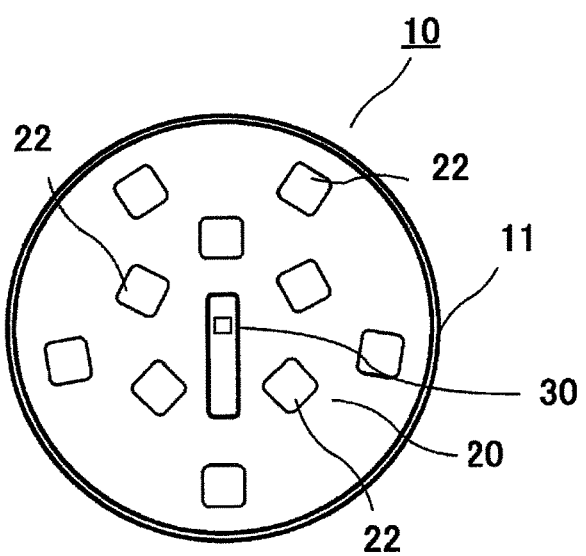

FIG. 10
(A)
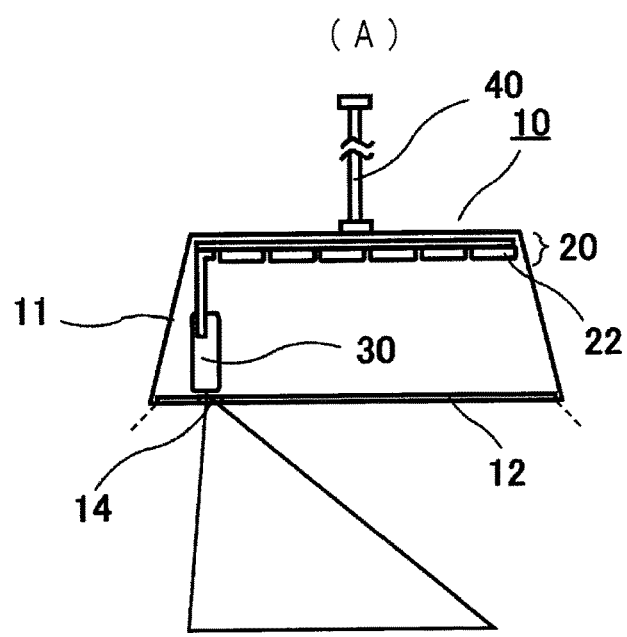
(B)
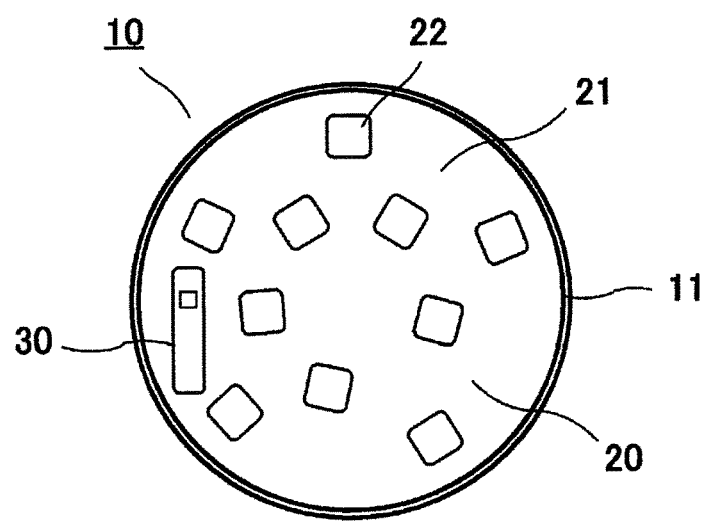

FIG. 11
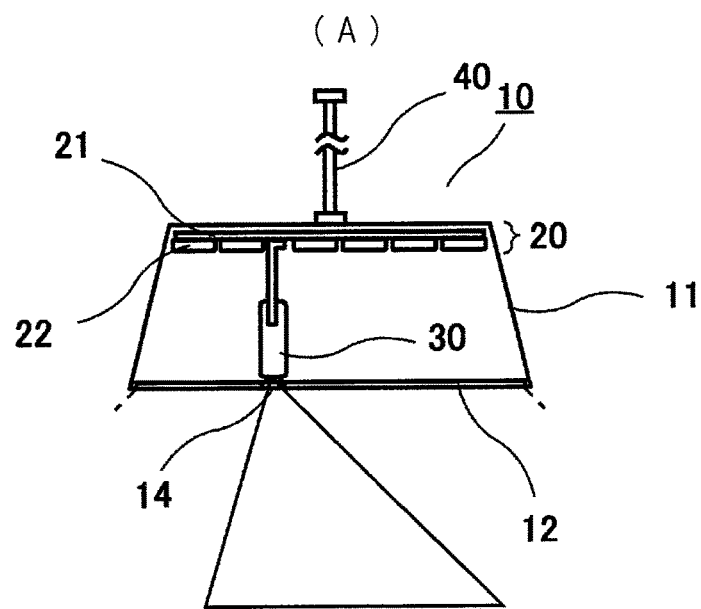
(A)
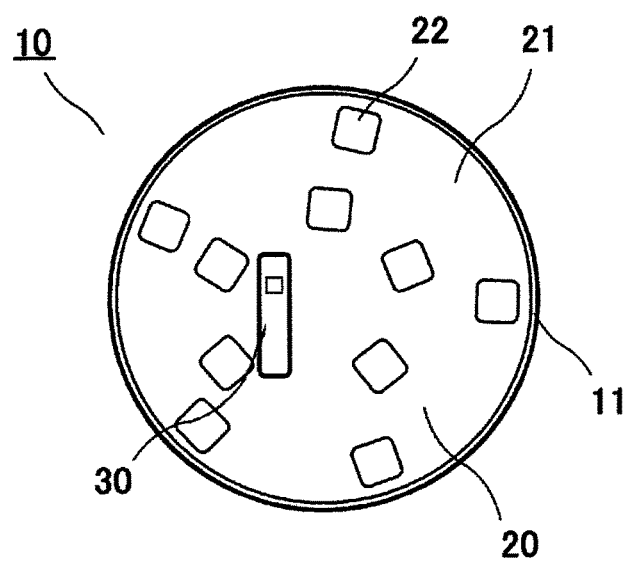
(B)

FIG. 12
(A)
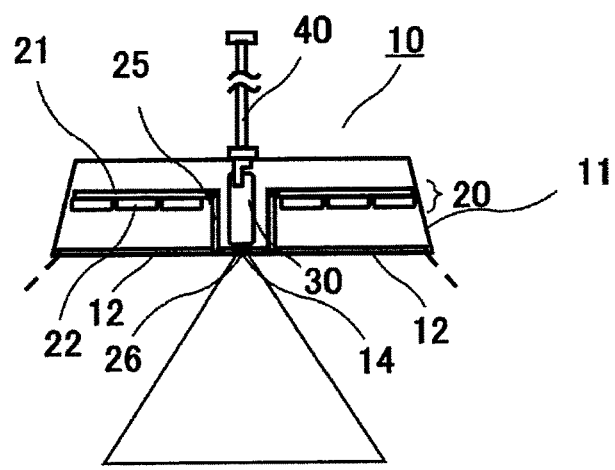
(B)
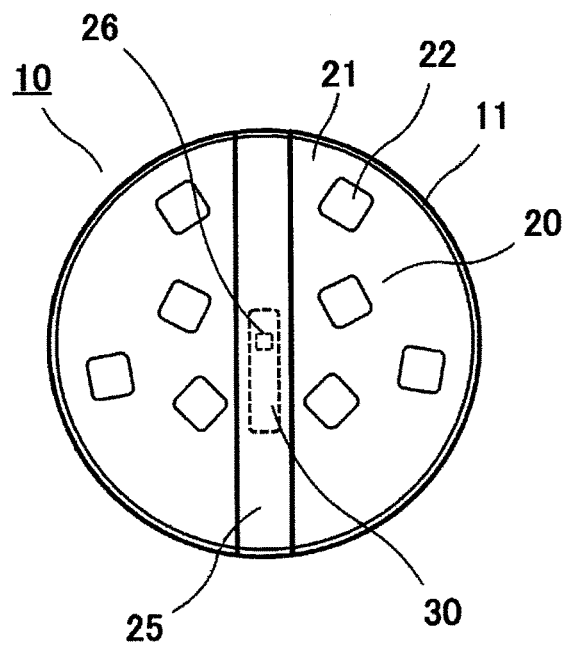

FIG. 13
(A)
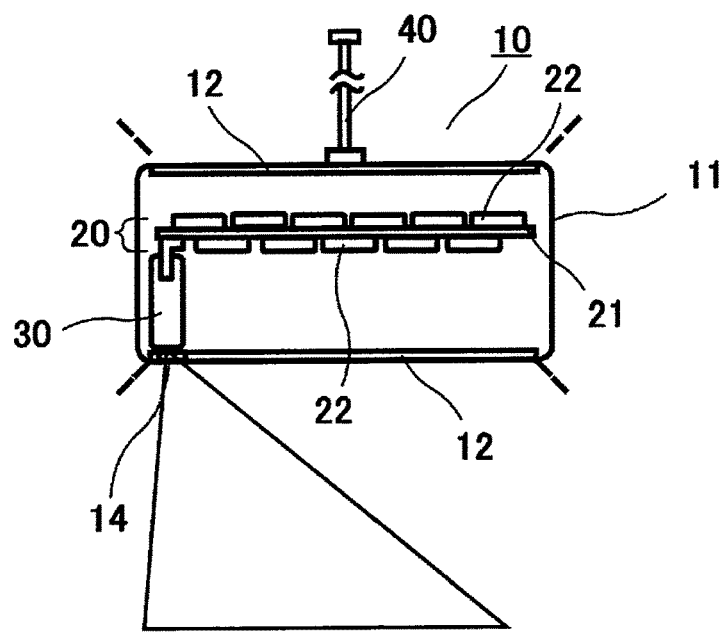
(B)
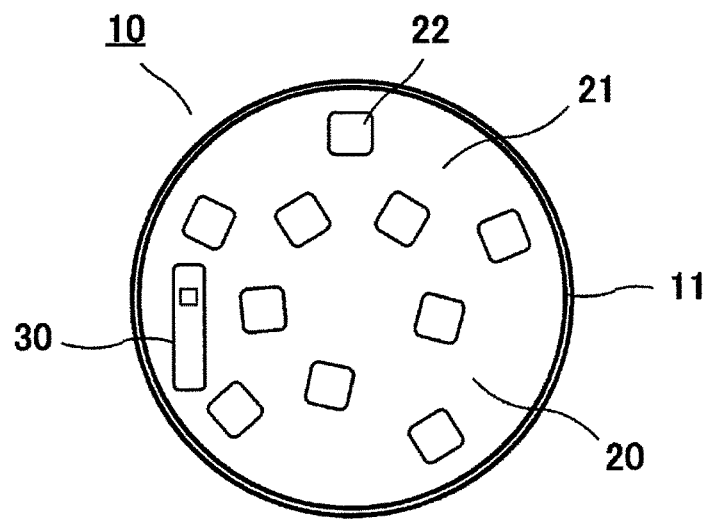

FIG. 14
(A)
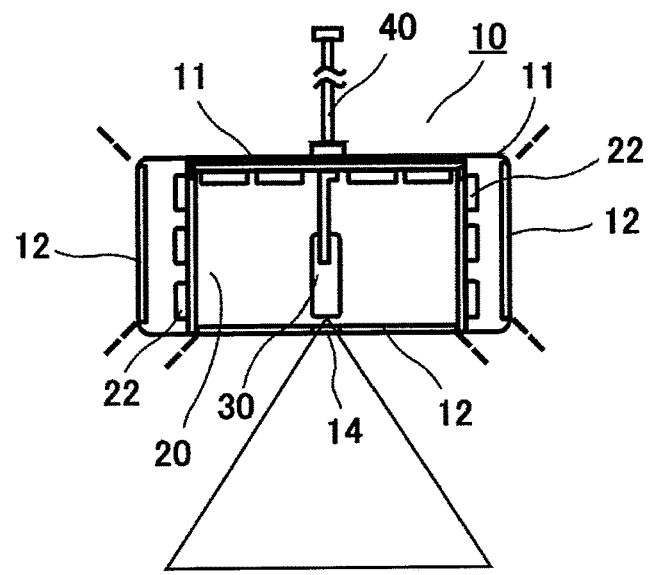
(B)
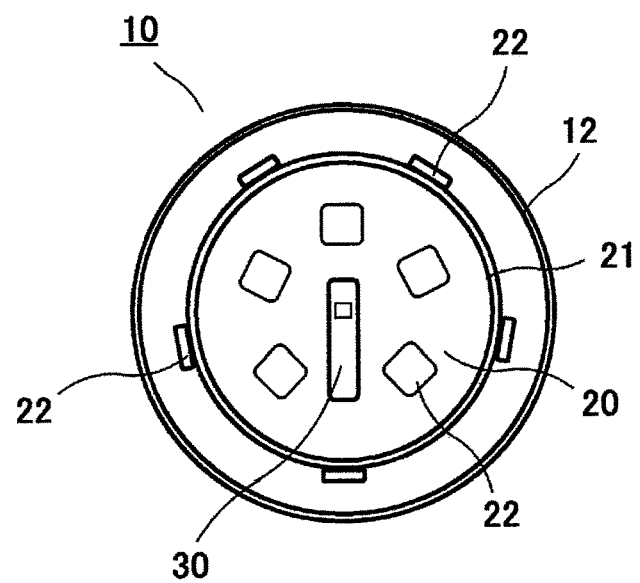

FIG. 15
(A)
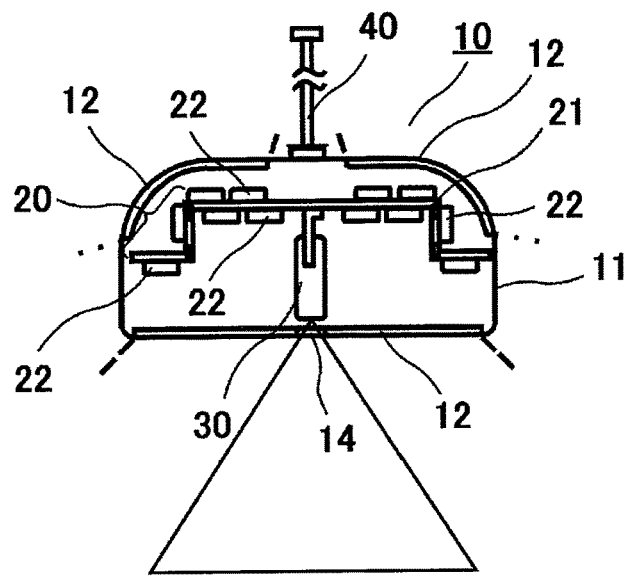
(B)
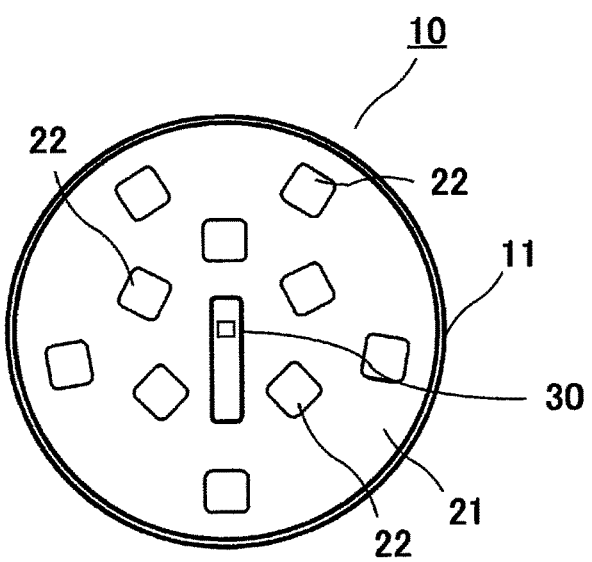

FIG. 17
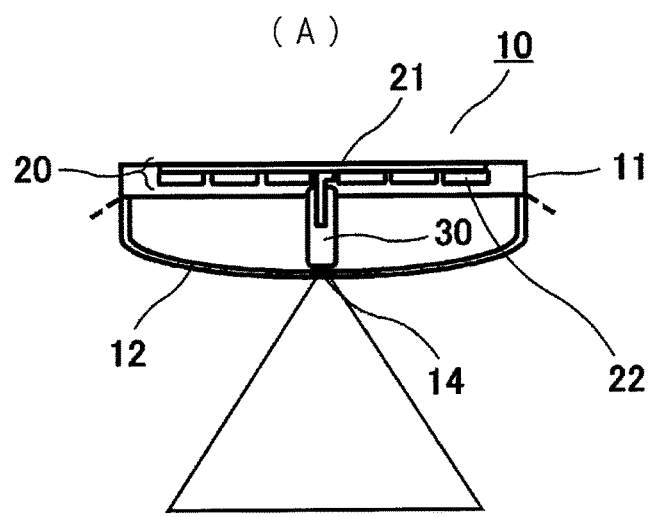
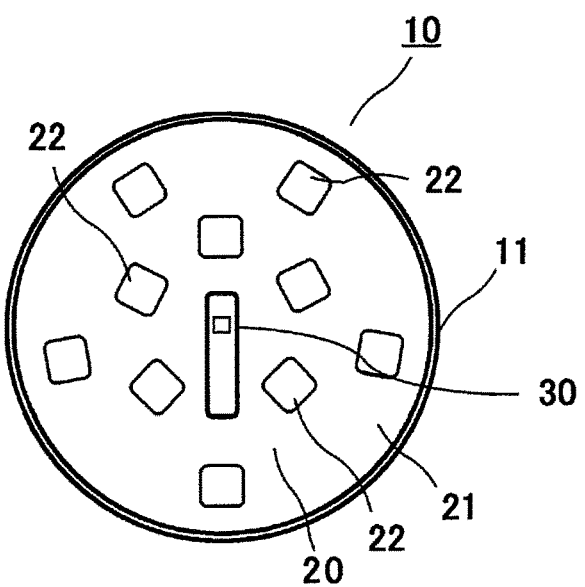

FIG. 18
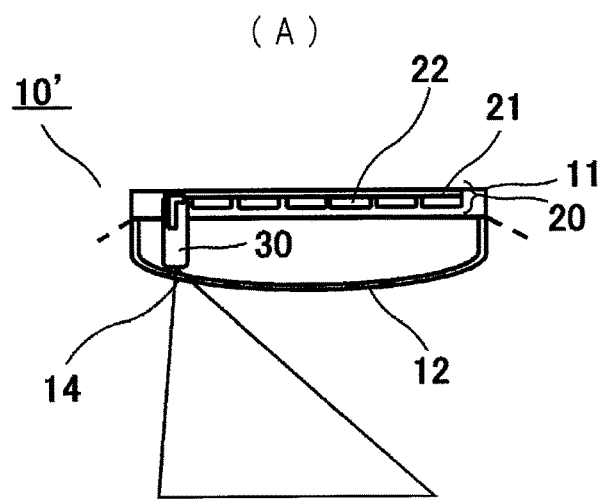
(A)
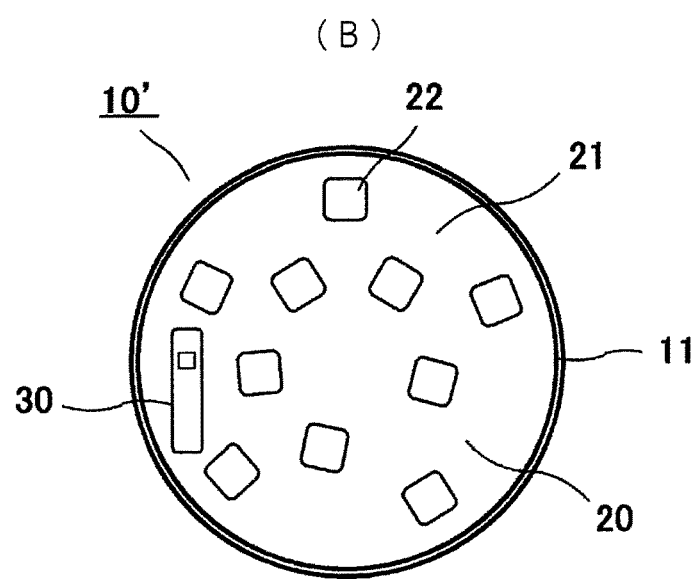
(B)

FIG. 19
(A)
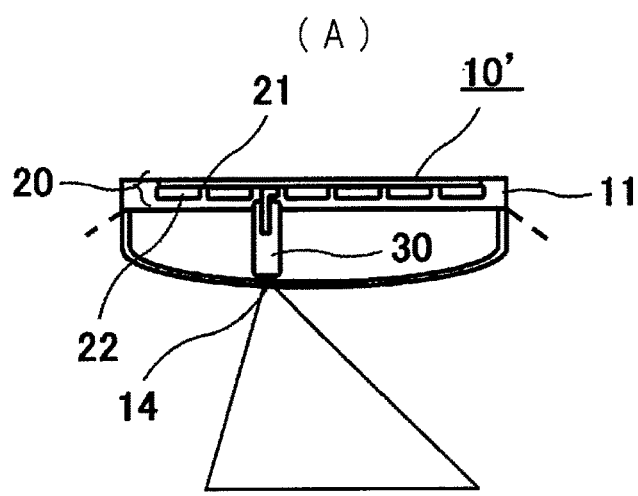
(B)
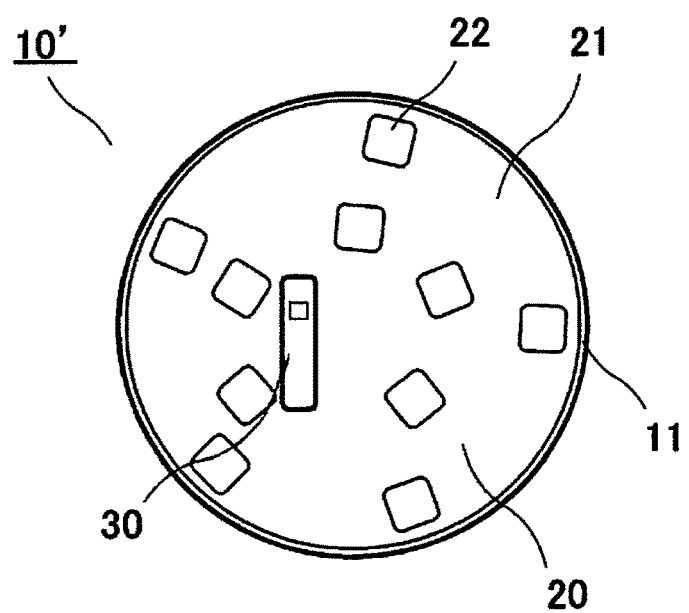

FIG. 20
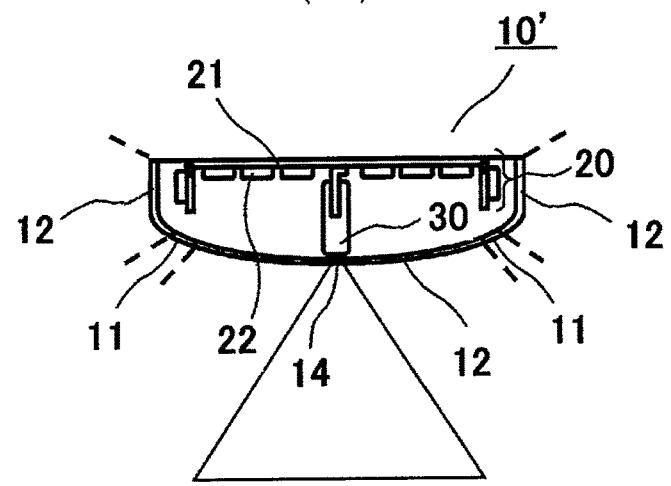
(A)
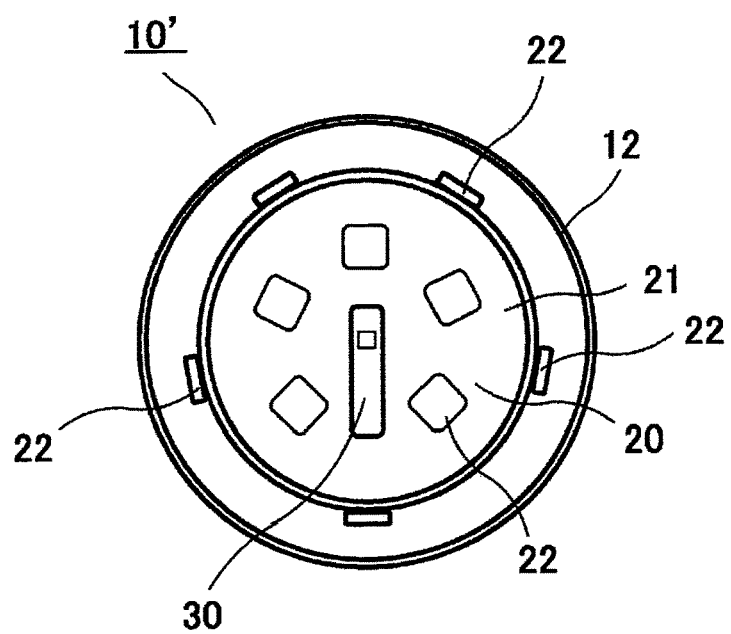
(B)

ILLUMINATION APPARATUS

TECHNICAL FIELD

The present invention relates to an illumination device.

BACKGROUND ART

Patent Document 1 listed below discloses a technique of attaching a communication functional module, which can utilize various functions by attaching it to a ceiling or a wall surface, to a ceiling light.

Furthermore, Patent Document 2 listed below discloses an illumination device equipped with an image projection device capable of the space production using illumination light and an image in combination.

RELATED ART DOCUMENTS

Patent Documents

Patent Document 1: Japanese Unexamined Patent Application Publication No. 2003-16831
Patent Document 2: Japanese Unexamined Patent Application Publication No. 2012-186118

SUMMARY OF THE INVENTION

Problems to be Solved by the Invention

However, the conventional techniques mentioned above just disclose a block diagram and a simple external shape of a projector, and do not disclose the layout of an optical system and an optical element of the projector in the illumination device or the layout of an optical unit in consideration of the arrangement of the optical system and the optical element. Thus, the consideration of an effective arrangement between an illumination light source in the illumination device having the image projection function and the optical unit of the projector serving as the image projection function has been still insufficient.

Therefore, the present invention has been achieved in consideration of the problems in the conventional techniques mentioned above, and an object of the present invention is to provide an illumination device in which a light source used for an illumination function and an optical unit used for an image projection function are suitably arranged.

Means for Solving the Problems

In order to achieve the object mentioned above, according to the present invention, an illumination device includes: a light source arranged inside a housing and generating the illumination light; a diffusing panel attached to a part of the housing and diffusing the illumination light from the light source; and a projector arranged inside a space formed by the housing and a part of the diffusing panel and projecting an image onto a projection surface, and an optical unit constituting the projector is arranged in a state where an incident direction of a light flux incident from a display element provided in the projector onto a projection optical system of the projector is a substantially vertical direction or a direction closer to a vertical direction than a direction parallel to a horizontal plane, or in a state where an optical axis of the projection optical system on which the light flux from the display element provided in the projector is incident is a substantially vertical direction or a direction closer to the vertical direction than the direction parallel to the horizontal plane.

Effects of the Invention

According to the present invention, it is possible to provide an illumination device in which a light source used for an illumination function and an optical unit used for an image projection function are suitably arranged.

BRIEF DESCRIPTIONS OF THE DRAWINGS

Figure 16:
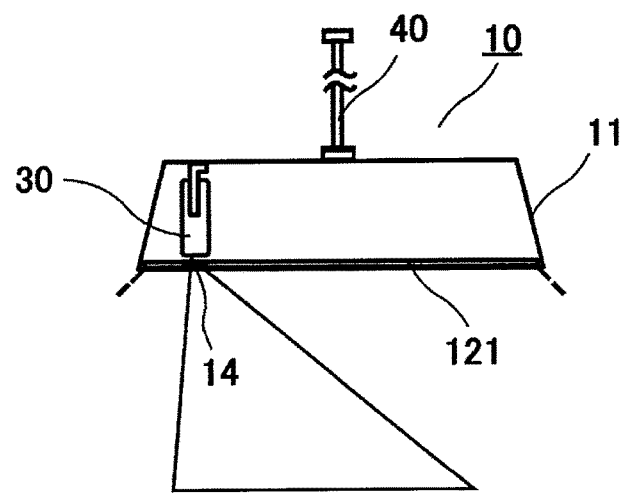
Figure 21:
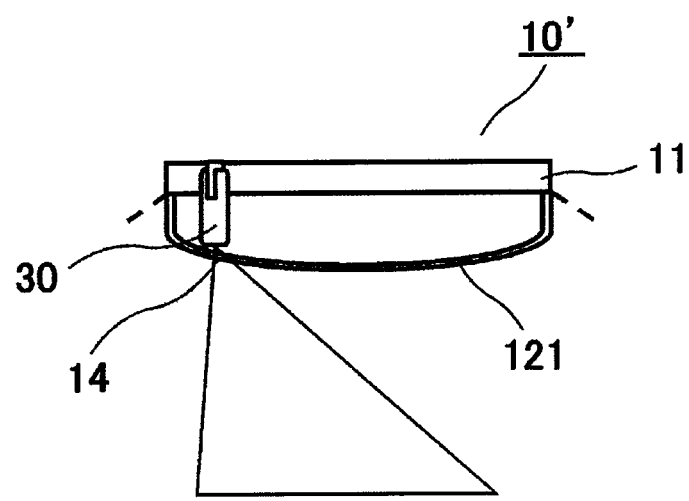

FIG. 9(A) and 9(B) area side view and a bottomview for describing an embodiment of the layout (arrangement) of the optical unit and the illumination light source in a housing of the pendant-type illumination device;

FIGS. 10(A) and 10(B) are a side view and a bottom view for describing another embodiment of the layout (arrangement) of the optical unit and the illumination light source in the housing of the pendant-type illumination device;

FIGS. 11(A) and 11(B) are a side view and a bottom view for describing another embodiment of the layout (arrangement) of the optical unit and the illumination light source in the housing of the pendant-type illumination device;

FIGS. 12(A) and 12(B) are a side view and a bottom view for describing a modification example of the layout (arrangement) of the optical unit and the illumination light source in the housing of the pendant-type illumination device;

FIGS. 13(A) and 13(B) are a side view and a bottom view for describing another modification example of the layout (arrangement) of the optical unit and the illumination light source in the housing of the pendant-type illumination device;

FIGS. 14(A) and 14(B) are a side view and a bottom view for describing another modification example of the layout (arrangement) of the optical unit and the illumination light source in the housing of the pendant-type illumination device;

FIGS. 15(A) and 15(B) are a side view and a bottom view for describing another modification example of the layout (arrangement) of the optical unit and the illumination light source in the housing of the pendant-type illumination device;

FIG. 16 is a side view for describing another modification example of the layout (arrangement) of the optical unit and the illumination light source in the housing of the pendant-type illumination device;

FIG. 17(A) and 17(B) are a side view and a bottom view for describing an embodiment of the layout (arrangement) of the optical unit and the illumination light source in a housing of the ceiling-type illumination device;

FIGS. 18(A) and 18(B) are a side view and a bottom view for describing another embodiment of the layout (arrangement) of the optical unit and the illumination light source in the housing of the ceiling-type illumination device;

FIGS. 19(A) and 19(B) are a side view and a bottom view for describing another embodiment of the layout (arrangement) of the optical unit and the illumination light source in the housing of the ceiling-type illumination device;

FIGS. 20(A) and 20(B) are a side view and a bottom view for describing a modification example of the layout (arrangement) of the optical unit and the illumination light source in the housing of the ceiling-type illumination device; and FIG. 21 is a side view for describing another modification example of the layout (arrangement) of the optical unit and the illumination light source in the housing of the ceiling-type illumination device.

DETAILED DESCRIPTION OF PREFERRED EMBODIMENTS

Hereinafter, embodiments of the present invention will be described in detail with reference to the attached drawings.

<Pendant-Type and Ceiling-Type Illumination Devices Equipped with Image Projection Function>

Figure 1:
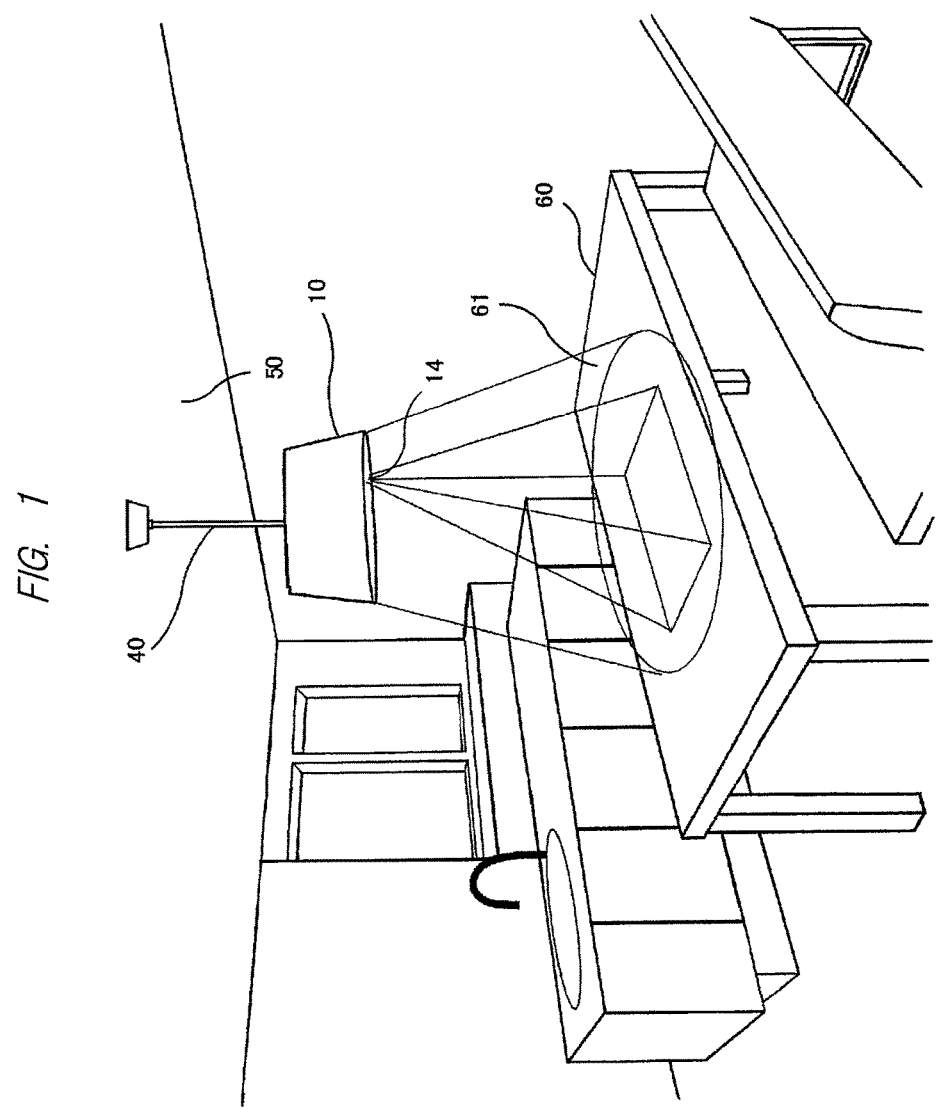
FIG. 1 is a perspective view showing an external appearance configuration of a pendant-type illumination device according to one embodiment of the present invention together with a usage environment thereof.
Figure 2:
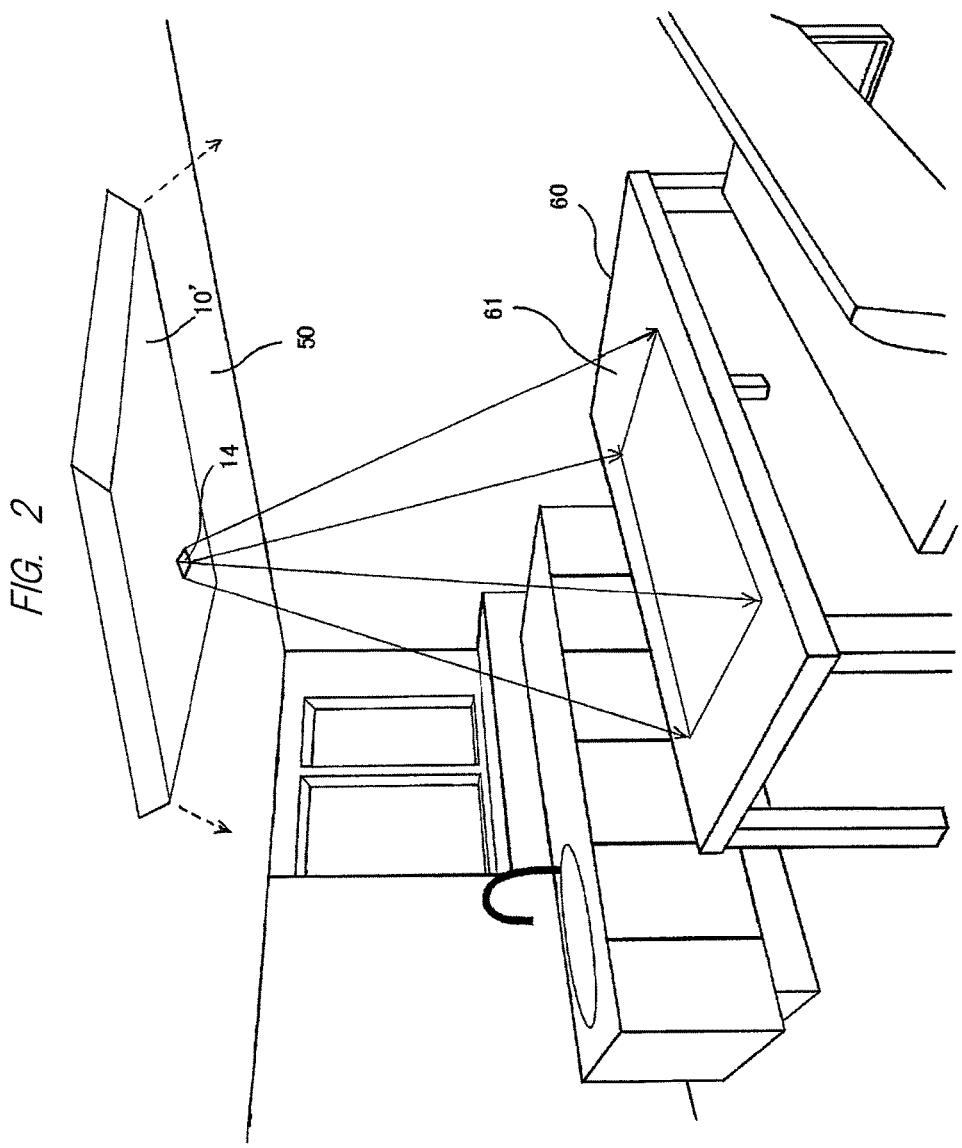
FIG. 2 is a perspective view showing an external appearance configuration of a ceiling-type illumination device according to one embodiment of the present invention together with a usage environment thereof.

First, FIGS. 1 and 2 each illustrate an external appearance configuration of an illumination device equipped with an image projection function according to one embodiment of the present invention. In particular, FIG. 1 illustrates the illumination device equipped with an image projection function, in which an image projection function is mounted on a so-called pendant-type illumination device attached in the form of being hung from a ceiling surface. FIG. 2 illustrates the illumination device equipped with an image projection function, in which an image projection function is mounted on a so-called ceiling-type illumination device attached to a ceiling surface.

As is obvious from the figures, the illumination devices 10 and 10' each equipped with the image projection function are attached onto a wall surface or a ceiling 50 constituting a space such as a kitchen, a dining room, a living room or an office when in use. More specifically, as illustrated in the figures, the illumination device is installed at a predetermined height above a table or a desk 60 placed in a room or installed integrally with the ceiling surface. The illumination devices 10 and 10' equipped with the image projection function each have both an illumination function of irradiating the upper surface of a table or a desk with illumination light and the image projection function of projecting and displaying various images onto an upper surface (display surface or projection surface) 61 of the table or the desk 60. Note that a reference character 40 in FIG. 1 particularly denotes a retainer for retaining the pendant-type illumination device 10 in the state of being hung at a desired position from the ceiling surface.

A horizontal plane of a table or a desk onto which an image is to be projected by the image projection function is likely to be an object illuminated by the illumination function when the image projection function is not used. Therefore, it is desirable that a region onto which an image is projected by the image projection function and a range to be illuminated with the illumination light of the illumination function are at least partially overlapped with each other.

Also, the illumination device equipped with the image projection function is desirably configured to include a control unit so that the illumination light of the illumination function and the image projected by the image projection function are individually turned ON and OFF.

Figure 3:
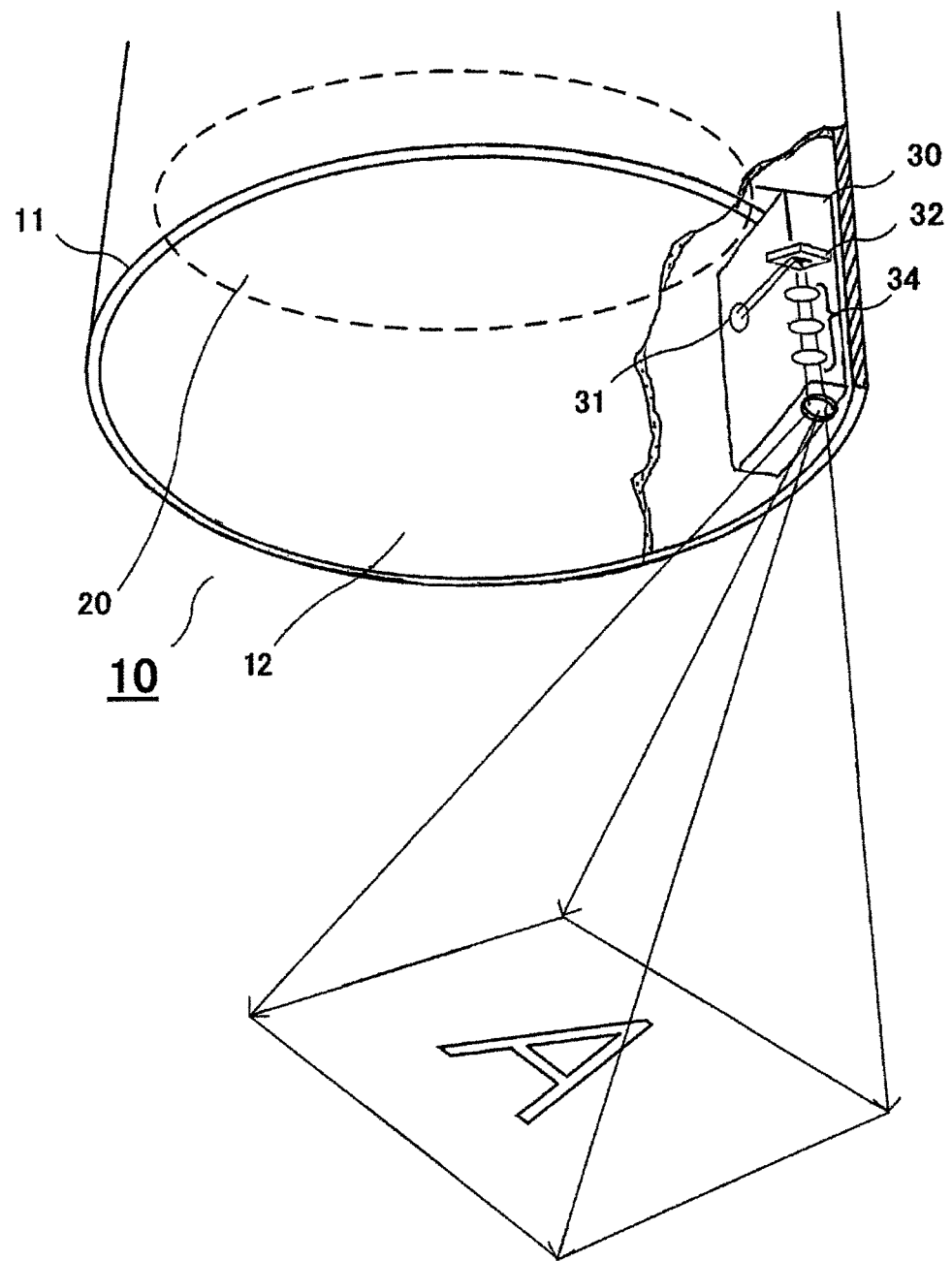
FIG. 3 is a view showing the illumination device seen from below, in which a part of a diffusing panel is removed in order to show an internal configuration thereof.

FIG. 3 illustrates an example of an internal configuration of the pendant-type illumination device 10 equipped with the image projection function illustrated in FIG. 1. As is obvious from the figure, though de scribed later in detail, an illumination light source 20 including a plurality of semiconductor light-emitting elements (LED) arranged in a planar form (here, illustration of each semiconductor light-emitting element is omitted and an attached position thereof is indicated with a broken-line circle) and a small-sized projector for projecting and displaying various images, in particular, a projector optical unit (optical engine) 30 which is a main unit constituting the projector are provided in a substantially cylindrical or conical main body (or referred to also as a housing) (shade) 11 made of synthetic resin formed by die molding.

Note that a reference character 12 in the figure denotes a so-called diffusing panel which is provided to cover a lower opening of the main body 11 and uniformly irradiate the illumination light downward by diffusing the illumination light from the illumination light source 20. Note that the external shape of the main body (shade) 11 has been described as being cylindrical or conical, but the present invention is not limited to this, and other shapes such as a box type may be provided.

Note that, though not illustrated here, it is needless to say that an internal configuration of the ceiling-type illumination device 10' equipped with the image projection function illustrated in FIG. 2 also includes an illumination light source including a plurality of semiconductor light-emitting elements (LED) arranged in a planar form, an optical unit constituting a small-sized projector for projecting and displaying various images, and a diffusing panel in a main body (housing or shade) made of synthetic resin formed by die molding like the pendant-type illumination device equipped with the image projection function described above. Also, the external shape of the main body (shade) has been described as being a quadrangular box-type in the example of FIG. 2, but the present invention is not limited to this, and other shapes such as a circular plate and an elliptical plate may be provided.

Figure 4:
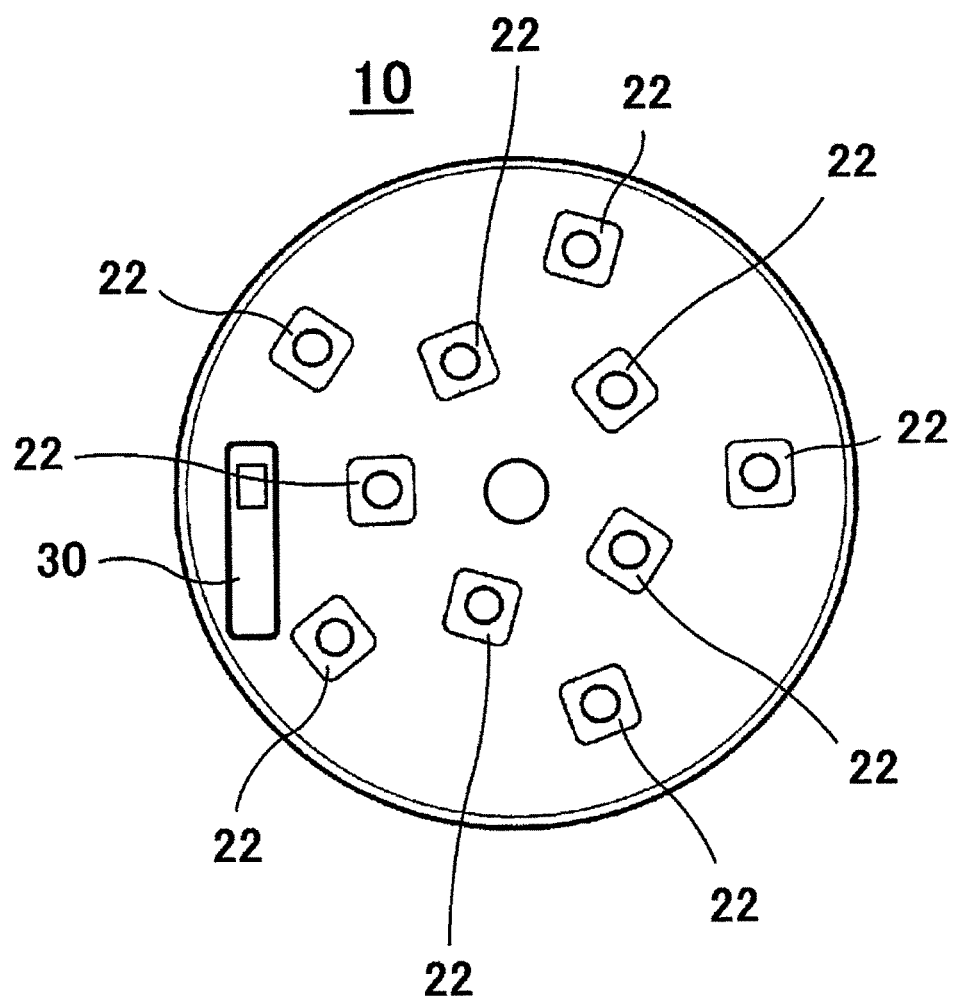
FIG. 4 is a view showing a specific example of an illumination light source in the illumination device.

FIG. 4 illustrates a specific example of the illumination light source 20 described above, and the figure is a bottom view of the pendant-type illumination device 10 equipped with the image projection function in FIG. 1 seen from below in a state where the diffusing panel 12 is removed. As is obvious from the figure, for example, a plurality of semiconductor light-emitting elements (LED) 22 (ten elements in this example) are arranged and attached on a surface of a disk-shaped board 21 made of, for example, metal having superior thermal conductivity so that the substantially uniform irradiation light can be acquired. In order to easily understand a structure, the illumination device 10 equipped with the image projection function in which the diffusing panel 12 is removed is illustrated in the following figures in which the illumination device 10 is viewed from below.

Note that, though not illustrated here, the diffusing panel 12 described above is made by a transparent or translucent member that scatters the irradiation light so as to cover the opening below the illumination light source 20, and an aperture or a transmissive window 14 that is a transparent window for transmitting image light is formed in a part of the diffusing panel 12, namely, at a position through which the image light is projected from the optical unit 30 of the projector.

In addition, though described later, in order to achieve an interactive function of the optical unit, a camera may be provided as a sensor attached to a part of the optical unit. Note that the camera is configured to detect an infrared light component in an imaging range including the display surface 61, and it is thus possible to detect the operation content of a user by capturing a motion of the user or detecting reflected light from an object operated by the user.

Figure 5:
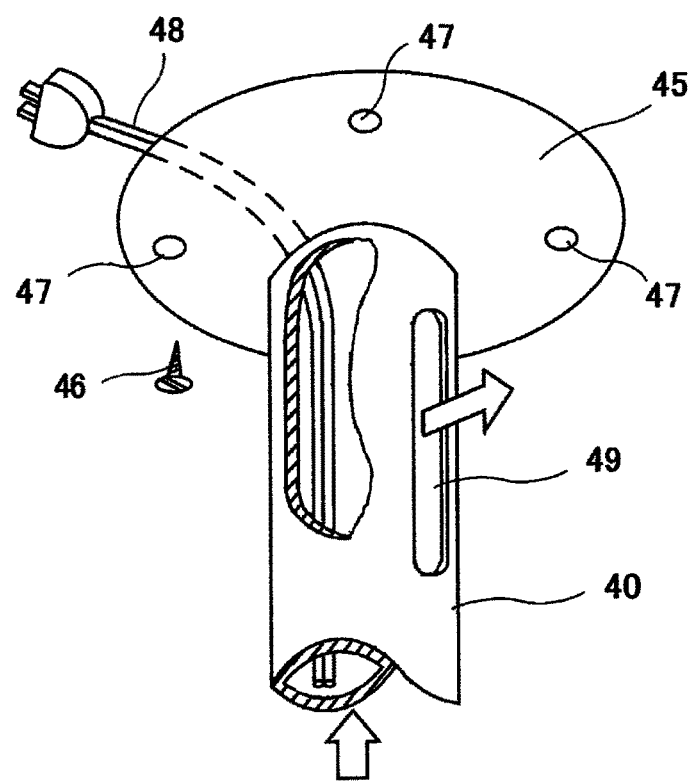
FIG. 5 is a view for describing a retainer for hanging the pendant-type illumination device from a ceiling surface.

Here, as illustrated in FIG. 1, the retainer 40 for retaining the main body 11 of the pendant-type illumination device 10 equipped with the image projection function in the state of being hung at a desired position from the ceiling surface is fixed to the upper surface of the illumination device 10 equipped with the image projection function. The retainer 40 will be described below with reference to FIG. 5.

Namely, one end (lower end) of the retainer 40 is fixed to a bottom surface (upper end surface) constituting the main body 11 of the illumination device 10 equipped with the image projection function, and a disk-shaped attachment 45 for fixation to the ceiling surface is provided at the other end (upper end) of the retainer 40, so that the disk-shaped attachment 45 is securely fixed to the ceiling surface with, for example, screws 46 and threaded holes 47.

Note that, according to the studies by the inventors for the illumination device 10 equipped with the image projection function capable of not only irradiating the upper surface of a table or a desk with the illumination light but also projecting and displaying an image onto the table or the desk, it was found that a situation where a projected image is shaken and the function as a display device cannot be sufficiently achieved may occur when the main body 11 of the illumination device equipped with the image projection function swings or rotates.

Therefore, in this example, the retainer 40 is formed of, for example, a hollow metal pipe made of aluminum, that is, a rigid member, so that a preferable result can be acquired. In this case, if the light source 20 including the semiconductor light-emitting elements (LED), a power cord 48 for supplying power to the optical unit 30, and a cable for supplying an image signal as needed are housed inside the pipe constituting the retainer 40, it becomes unnecessary that the power cord and the cable are laid outside the pipe, and an illumination device equipped with an image projection function with superior design can be provided.

Further, if the pipe constituting the retainer 40 is configured so that the lower end thereof is open to an internal space of the main body 11 of the illumination device equipped with the image projection function, namely, air inside the main body 11 of the illumination device equipped with the image projection function can flow into the pipe of the retainer 40, heat generated from the light source 20 and the optical unit 30 housed inside the main body can be guided into the pipe by a so-called chimney effect and discharged to the outside through a slit aperture 49 formed in an upper part of the pipe (see white arrows in the figure). Accordingly, it is possible to contribute to the efficient cooling of the illumination device 10 equipped with the image projection function.

Furthermore, though not illustrated here, a pipe obtained by coaxially combining a plurality of pipes having different diameters in a slidable manner and providing a fixture at a part of the pipes so that the entire length thereof is adjustable may be used as the pipe constituting the retainer 40. Accordingly, the height of the illumination device 10 equipped with the image projection function hung from the ceiling 50 can be flexibly adjusted, and it is thus possible to realize the illumination device equipped with an image projection function having more superior availability.

Figure 6:
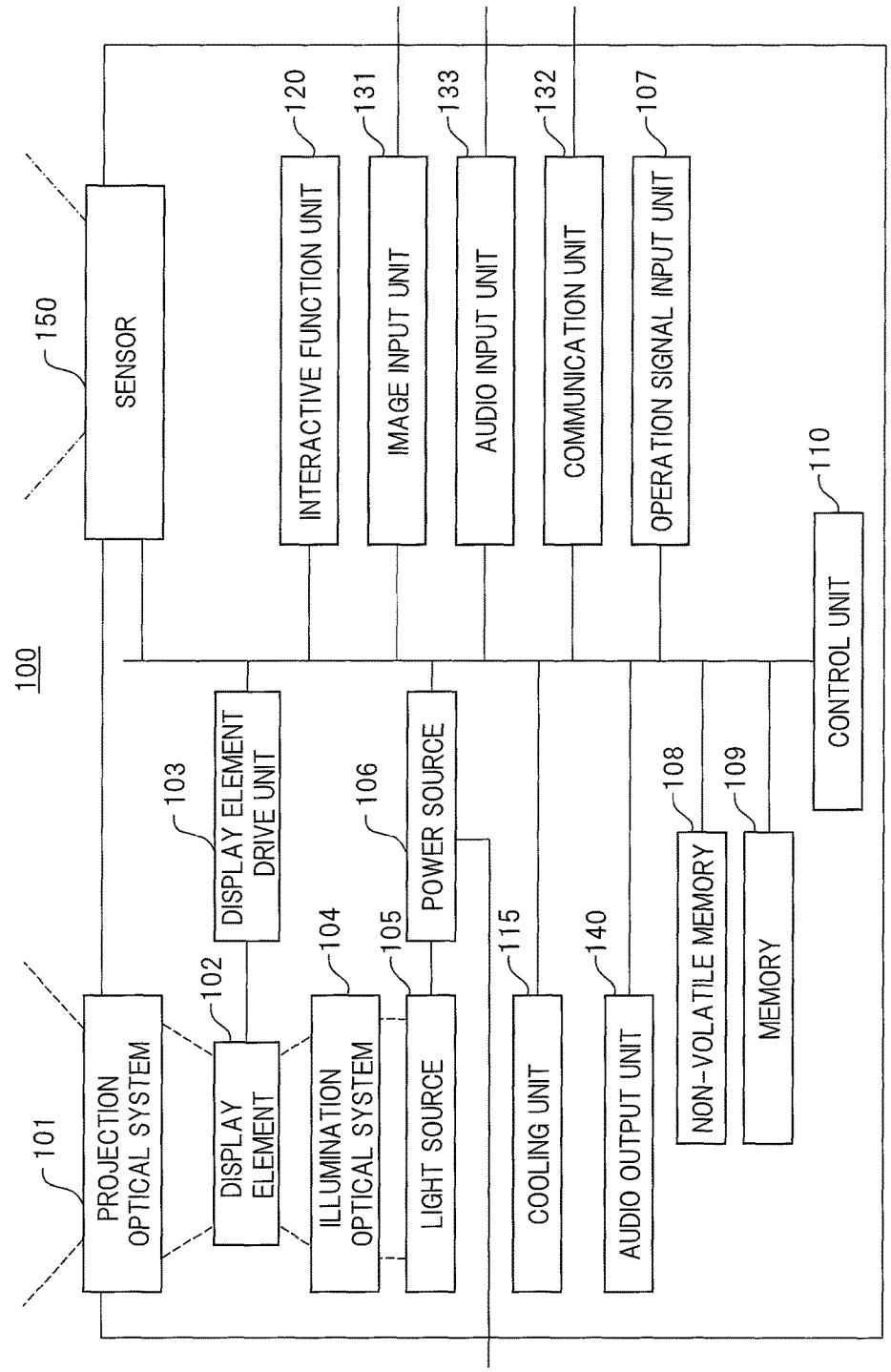
FIG. 6 is a block diagram showing an internal circuit configuration of an optical unit of the illumination device in detail.

FIG. 6 is a block diagram showing an example of an internal circuit configuration of the optical unit 30, namely, the projection image display device in detail.

A projection optical system 101 (reference character 34 in FIG. 3) is an optical system that projects an image onto the display surface 61, and includes a lens and/or a mirror. A display element 102 (reference character 32 in FIG. 3) is an element that generates an image to be projected, and a transmissive liquid crystal panel, a reflective liquid crystal panel, a digital micromirror device (DMD: registered trademark) or the like is used as the display element 102. A display element drive unit 103 transmits a drive signal in accordance with an image signal to the display element 102. A light source 105 (reference character 31 in FIG. 3) generates illumination light for projection, and a high-pressure mercury lamp, a xenon lamp, a LED light source, a laser light source or the like is used as the light source 105.

A power source 106 supplies power to the light source 105. An illumination optical system 104 condenses the illumination light generated by the light source 105 so as to irradiate the display element 102 with the uniformed illumination light. A cooling unit 115 cools respective units to be in a high-temperature state such as the light source 105, the power source 106 and the display element 102 as needed by the air cooling method or the liquid cooling method. An operation signal input unit 107 is an operation button on the device body or a light-receiving unit for a remote controller, and inputs an operation signal from a user.

An external image output device is connected to an image input unit 131 to input image data from the external image output device.

An external image output device is connected to an audio input unit 133 to input audio data from the external image output device. An audio output unit 140 is capable of performing audio output based on the audio data input into the audio input unit 133. Also, the audio output unit 140 may output a built-in operation sound or error alarm. A communication unit 132 is connected to, for example, an external information processing device to input and output various control signals.

A non-volatile memory 108 stores data and display icons for various operations in the interactive function, data for calibration to be described later, and other data used for the projector function. A memory 109 stores image data to be projected and control data of the device. A control unit 110 controls the operation of each unit in the device. In particular, the control unit 110 controls a sensor 150 and an interactive function unit 120 to execute the interactive function.

The sensor 150 can detect reflected light from an operated object by detecting an infrared light component with a camera that captures a range overlapped with an image projection region on the display surface 61. Note that, by setting the cut wavelength of an optical filter of the sensor 150 within a visible light wavelength region (for example, setting it within the red visible light region), a partial visible light component (namely, a projected image on a display screen) other than infrared light can be captured together with the infrared light component.

The interactive function unit 120 performs an interactive operation such as writing of a character or a figure into an image region based on the operation of a luminous pen or a finger by a user. Thus, the interactive function unit 120 includes a function of analyzing an infrared image acquired from the sensor 150 to calculate the position of the luminous pen or the finger (position operated by the user) and a function of executing applications operable with the luminous pen or the finger such as an application that composites an operation icon in the projected image or performs drawing operation on the basis of the operation of the user and an application that performs operation for an image input from the external image output device.

Here, the capturing range of the sensor 150 and the range of an image projected onto the display surface 61 (optical image in the image region of the display element 102 on the display surface 61) do not agree with each other. Therefore, when calculating the position operated (drawn) by the user, conversion between coordinates in the capturing range of the sensor 150 and coordinate positions in the image projected onto the display surface 61 is needed. Thus, the interactive function unit 120 includes a function of performing the process for the conversion and a function of performing the process of generating conversion table data (calibration data) for the conversion process.

An external image output device is connected to the image input unit 131 to input image data from the external image output device. An external image output device is connected to the audio input unit 133 to input audio data from the external image output device. The communication unit 132 is connected to, for example, an external information processing device to input and output various control signals.

Note that, in the example described above, as illustrated in FIG. 3, the light from the light source 31 of the optical unit 30 (for example, semiconductor light-emitting element (LED)) is modulated into image light by the display unit 32 configured of a reflective image display element such as a digital micromirror device (DMD: registered trademark) (or transmissive image display element such as a liquid crystal panel), and the image light is projected to the outside through the projection optical system 34 including various lenses.

Namely, the image projected downward from the optical unit 30 is displayed in a range at least partially overlapped with a region onto which the illumination light can be irradiated by the illumination device 10 equipped with the image projection function below the optical unit 30. Note that the details of the optical unit 30 will be described later again. Prior to this, however, the positional relationship between the optical unit 30, the illumination light source 20, and the diffusing panel 12 inside the main body (shade) 11 of the illumination device 10 equipped with the image projection function will be described below.

Also, for example, the circuit configuration illustrated in FIG. 6 may be assembled on a circuit board and arranged inside the optical unit 30, or may be arranged outside (for example, on the back surface of the disk-shaped board 21 on which the illumination light source 20 to be described in FIG. 10 and thereafter is arranged).

<Definition of Placement of Projector Optical Unit>

Here, the placement of the optical unit (30) constituting the projector is defined as follows in the present specification.

<Vertical Orientation of Optical Unit>

Figure 7:
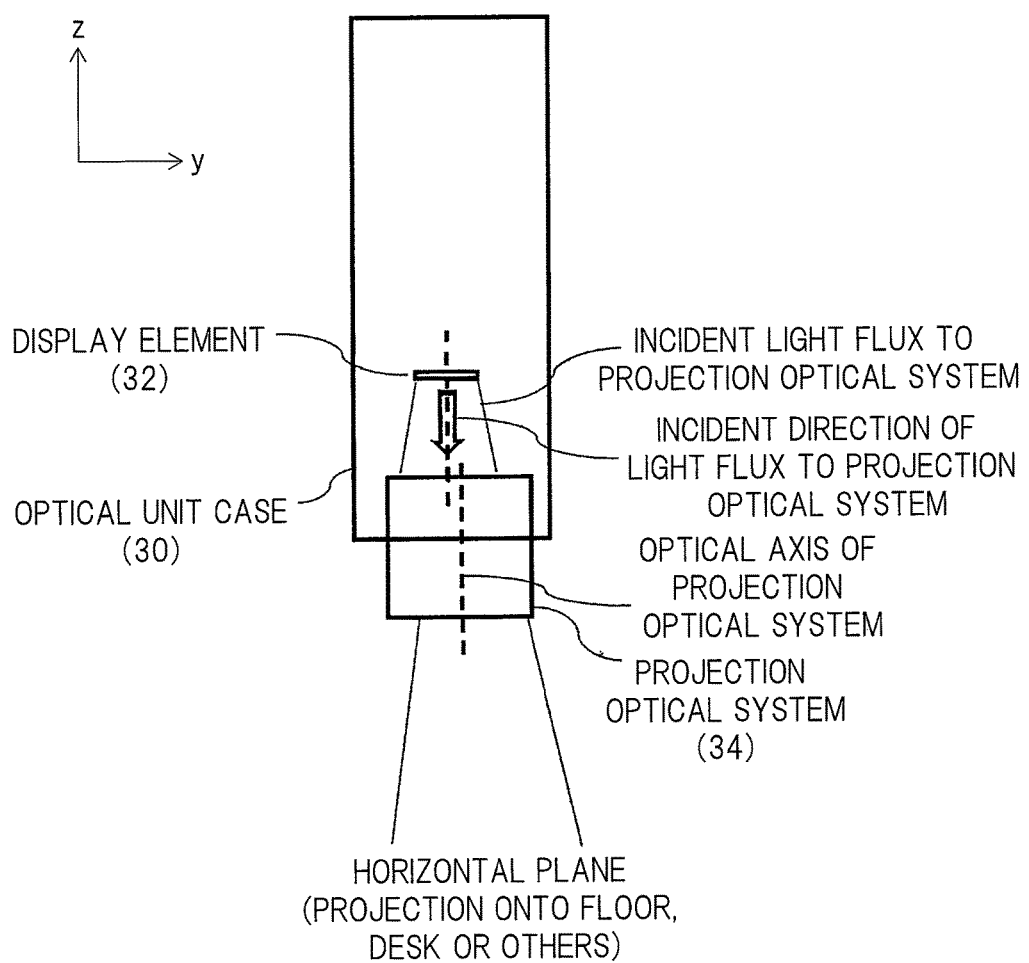
FIG. 7 is a side view for defining a vertical orientation which is a placement of the optical unit in the illumination device.
Figure 8:
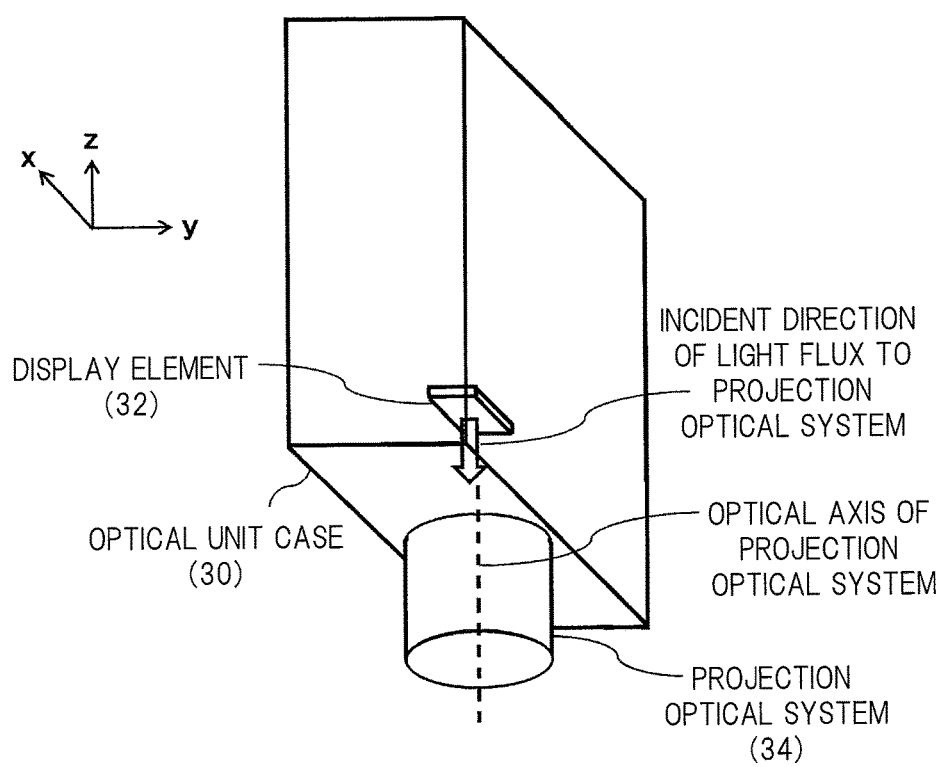
FIG. 8 is a perspective view for defining the vertical orientation which is a placement of the optical unit in the illumination device.

As illustrated in FIGS. 7 and 8, in a case where a light flux from the display element (reference character 32 of FIG. 3) constituting the projector is incident on the so-called projection optical system (34) including various optical elements such as a lens, the vertical orientation of the optical unit indicates the state where the incident direction of the light flux or the optical axis of the projection optical system (34) on which the light flux is incident is arranged in a substantially perpendicular direction relative to a horizontal plane (plane perpendicular to the surface of the figure) or is arranged in a direction closer to a vertical direction than a direction parallel to the horizontal plane. Note that a z direction is the vertical direction, that is, the direction perpendicular to the horizontal plane in FIGS. 7 and 8.

With the layout described above, light emitted from the projection optical system (34) can form an optical image of the display element (32) onto the horizontal plane. Though not illustrated here, various layouts are available for an optical system from the light source (31) to the display element (32), and examples of the display element (32) include a transmissive type and a reflective type. In addition, various optical systems such as that having a layout including one unit of the display element (32) and that having a layout including a plurality of display elements are known.

However, in a case where an optical unit case is to be miniaturized with the vertical orientation layout illustrated in FIGS. 7 and 8, the size reduction of the optical unit in the z direction of the figure is not easy in consideration of the layout of the display element (32) and the projection optical system (34).

However, in the vertical orientation layout of the optical unit (30), the size reduction of the optical unit in a y direction is easy in comparison to the other directions. Therefore, in the case where the optical unit case is to be miniaturized with the vertical orientation layout, the optical unit thinner in the y direction than in the z direction is formed as illustrated in the perspective view of FIG. 8.

Note that, as indicated by broken lines in the figure, the position of the optical image of the display element on the horizontal plane can be varied by changing a relative position setting on an xy plane between the center position of the display element (32) and the optical axis of the projection system (34). Accordingly, the position of a projected image on the horizontal plane can be flexibly set in accordance with the need in design.

Subsequently, more specific layouts (arrangements) of the pendant-type illumination device 10 equipped with the image projection function in which the optical unit (30) is provided in accordance with the vertical orientation layout described above will be described below with reference to FIGS. 9 to 11.

<Pendant-Type Illumination Device Equipped with Image Projection Function>

First, FIGS. 9(A) and 9(B) are a side sectional view and a bottom view of the pendant-type illumination device 10 equipped with the image projection function. In this example, the board 21 of the illumination light source 20 including the plurality of semiconductor light-emitting elements (LED) 22 is attached to an inner bottom surface of the housing (shade) 11 serving as a main body. Furthermore, the diffusing panel 12 is attached to the housing so as to cover an opening plane on the lower side of the figure. In addition, the optical unit 30 is arranged so as to be located at a substantially center portion of an illumination light flux in a space formed by the housing (shade) 11 and the diffusing panel 12.

In the example of FIG. 9(A) and 9(B), an aperture or a transmissive window 14 is provided in the diffusing panel 12 at the position where the projection light is emitted downward from the optical unit 30. This is because, if the aperture or the transmissive window is not provided and the entire surface of the diffusing panel 12 has a diffusing effect, a projection image emitted from the optical unit 30 is also diffused and the image cannot be formed on a surface on which the image is to be projected such as a table or a desk. The aperture or the transmissive window 14 may be an opening obtained by cutting the diffusing panel 12 or may be a transparent material having no diffusing effect such as glass.

In the case where the transmissive window is formed of the transparent material, a configuration in which dust and others barely enter inside the diffusing panel 12 can be provided. However, in order to prevent the projection image emitted from the optical unit 30 from being affected as much as possible, it is preferable to provide the coating whose spectral characteristics are flat as much as possible in a wavelength region of the projection light emitted from the optical unit 30.

Note that the periphery of the aperture or the transmissive window 14 is not necessarily directly coupled to the diffusing panel 12, and a region for a decorative panel may be provided between the aperture or the transmissive window 14 and the diffusing panel 12 in order to make the shadow of the optical unit 30 difficult to be seen on the diffusing panel 12. Namely, the aperture or the transmissive window 14 is an outlet port or a transmission port necessary for emitting the image projection light projected from the optical unit 30 arranged in the space formed by the housing (shade) 11 and the diffusing panel 12, and the position thereof may be located in the diffusing panel 12 or a part of another component.

With the layout (arrangement) described above, since the optical unit 30 can be thinned in a direction parallel to the horizontal plane, the rate of the shadow formed by the optical unit 30 to the illuminated area on the diffusing panel 12 from the illumination light source 20 can be reduced. Accordingly, it is possible to suppress the degradation of the quality of appearance as an illumination device due to the influence of the shadow of the optical unit 30 formed on the diffusing panel 12 (namely, sense of discomfort as an illumination device due to the shadow on the diffusing panel 12). Even in the case where the housing (shade) 11 is formed of a diffusing panel, the shadow of the optical unit 30 is inconspicuous and it is possible to suppress the degradation of the quality of appearance as an illumination device.

Note that the diffusing panel 12 has an effect of diffusing the light from the plurality of semiconductor light-emitting elements (LED) 22 each having a small light-emitting area to convert the light into diffusion light having more uniform light distribution characteristics. If the number of the semiconductor light-emitting elements (LED) 22 is increased, more uniform diffusion light can be obtained, but this results in the cost increase. In the case where the number of the plurality of semiconductor light-emitting elements (LED) 22 is fixed, lights emitted from the semiconductor light-emitting elements (LED) 22 arranged adjacent to each other are overlapped more as the distance between the plurality of semiconductor light-emitting elements (LED) 22 and the diffusing panel 12 increases, so that more uniform diffusion light is acquired. Therefore, it is preferable that the distance between the plurality of semiconductor light-emitting elements (LED) 22 and the diffusing panel 12 is made as long as possible, in order to achieve both cost performance and the acquisition of uniform diffusion light.

Meanwhile, since the projection optical system of the optical unit 30 is a magnifying projection system, the projection light projected downward from the optical unit 30 is magnified as it travels downward. Thus, it is preferable that the distance between the position at which the projection light is output in a downward direction from the optical unit 30 (position at which the projection light is emitted downward from the projection optical system 34 in the example of FIGS. 7 and 8) and the aperture or the transmissive window 14 is as short as possible. This is because, if the distance is increased, the area of the aperture or the transmissive window 14 provided in a part of the diffusing panel 12 needs to be increased due to the magnification of the image projection light, and the diffusing effect of the illumination light at that part cannot be acquired.

Accordingly, it is possible to suitably obtain the entire balance between the cost performance, the uniformity of the diffusion light, and the miniaturization of the aperture or the transmissive window if the optical unit 30 is provided in accordance with the vertical orientation layout in the space formed by the housing (shade) 11 and the diffusing panel 12 and the position at which the projection light is output in a downward direction from the optical unit 30 is located at a position lower than the light source 20 as illustrated in FIGS. 9(A) and 9(B). In this manner, the distance can be secured between the plurality of semiconductor light-emitting elements (LED) 22 and the diffusing panel 12, and the distance between the position at which the projection light is output in a downward direction from the optical unit 30 and the aperture or the transmissive window 14 can be reduced, so that it is possible to suitably obtain the entire balance between the cost performance, the uniformity of the diffusion light, and the miniaturization of the aperture or the transmissive window.

A similar effect can be acquired by providing a similar distance relationship also in the cases illustrated in FIGS. 10(A) and 10(B), 11(A) and 11(B), 12(A) and 12(B), 13(A) and 13(B), 14(A) and 14(B), 15(A) and 15(B), 17(A) and 17(B), 18(A) and 18(B), 19(A) and 19(B) and 20(A) and 20(B) to be described later. In this case, the position at which the image projection light is emitted from the optical unit 30 is arranged between the light source 20 and the aperture or the transmissive window 14 with the arrangement in the vertical direction.

FIGS. 10(A) and 10(B) are a side sectional view and a bottom view of the pendant-type illumination device 10 equipped with an image projection function. In this example, the optical unit 30 attached inside the housing (shade) 11 is arranged so as to be located at an end portion of an illumination light flux.

With this layout (arrangement), it is possible to suppress the degradation of the quality of appearance as an illumination device like in the example of FIGS. 9(A) and 9(B). Further, in the arrangement of FIGS. 10(A) and 10(B), the optical unit 30 is arranged so as to be located at the end portion of the illumination light flux, and further the optical axis of a projection optical system and the center position of a display element are relatively shifted in a horizontal direction inside the optical unit 30, so that the center of a projected image is made to come close to the center of the illumination light flux of the illumination light source 20 with respect to an emission port of the projection optical system of the projector.

Furthermore, in the arrangement of FIGS. 10(A) and 10(B) to be described below, a so-called stationary projector which is usually placed on a desk for use can be directly applied. This is because the optical axis of a projection optical system and the position of the center of a display element are typically shifted in most of the stationary projectors. Therefore, the illumination device equipped with the image projection function of FIGS. 10(A) and 10(B) has a structure suitable for cost reduction. This effect is acquired similarly in the other examples in which the optical unit 30 is located at the end portion of the downward illumination light flux.

Furthermore, as illustrated also in FIGS. 11(A) and 11(B), the optical unit 30 can be arranged at an intermediate position between the layout (arrangement) of FIGS. 9(A) and 9(B) and the layout (arrangement) of FIGS. 10(A) and 10(B). Also in this case, it is possible to suppress the degradation of the quality of appearance as an illumination device like in the cases described above.

Furthermore, modification examples of the pendant-type illumination device 10 equipped with the image projection function will be described with reference to FIGS. 12 to 16.

FIGS. 12(A) and 12(B) illustrate a configuration in which a center part of the board 21 for the illumination light source 20 provided with the plurality of semiconductor light-emitting elements (LED) 22 is folded into a substantially U shape to form groove portion 25 and the optical unit 30 is arranged inside the groove portion (namely, located at a substantially center portion of an illumination light flux). With this configuration, since the optical unit 30 is arranged in the groove portion 25, the shadow of the optical unit 30 itself is not directly cast below the diffusing panel 12 having a white surface, and it is thus possible to further suppress the degradation of the quality of appearance as an illumination device in addition to the effect of the vertical orientation of the optical unit. Note that an aperture (or transmissive window) 26 for transmitting projection light from the optical unit 30 is formed in a part of the groove portion 25, namely, the position at which the optical unit 30 is arranged.

In particular, by applying coating with high reflectance such as white coating or mirror coating to the outer surface of the groove portion 25 (surface on the side opposite to the surface in which the optical unit 30 is housed) from which illumination light from the plurality of semiconductor light-emitting elements (LED) 22 is reflected, it is possible to suppress the shadow of the groove portion 25 itself from being formed on the diffusing panel 12.

The diffusing panel 12 may be provided on the bottom surface of the groove portion 25, but the diffusing panel 12 is not necessarily provided to the portion of the bottom surface of the groove portion 25. In the example of FIGS. 12(A) and 12(B), the diffusing panel 12 is divided into two sections by the bottom surface of the groove portion 25.

FIGS. 13(A) and 13(B) illustrate a configuration in which the plurality of semiconductor light-emitting elements (LED) 22 are arranged on both surfaces of the board 21 for the illumination light source 20. Namely, the configuration capable of irradiating illumination light upward as well as downward is illustrated. Note that, in FIGS. 13(A) and 13(B), the optical unit 30 is arranged at an end portion of the illumination light flux of the downward illumination light, but the optical unit 30 may be arranged at a center portion of the illumination light flux of the downward illumination light. With this configuration, the illumination light can be irradiated also to an upper side of the illumination device 10 equipped with an image projection function, and the illumination device 10 equipped with the image projection function can function also as indirect illumination because the ceiling or the like can be irradiated with the upward irradiation light (ceiling indirect illumination function). Note that, in this example, a diffusing panel 12 (upper diffusing panel) is attached so as to cover an opening plane of the upper surface of the housing (shade) 11 in addition to the diffusing panel 12 (lower diffusing panel) for the opening plane of the lower surface of the housing (shade) 11.

In addition, by providing the configuration including the illumination function having a plurality of different irradiation directions and the image projection function, the switching between a plurality of irradiation combination modes of the irradiation light and the projection image can be achieved. For example, the switching control for a mode in which only the projection image is projected in a downward direction, a mode in which the irradiation light is irradiated downward and the image is not projected, a mode in which the irradiation light is irradiated upward and the image is not projected, and a mode in which the irradiation light is irradiated upward and the projection image is projected in the downward direction may be performed.

FIGS. 14(A) and 14(B) illustrate a configuration example in which the board 21 for the illumination light source 20 is formed to have a cylindrical shape by extending the end portion thereof in the perpendicular direction, a plurality of semiconductor light-emitting elements (LED) 22 are attached onto the bottom surface thereof, and a plurality of semiconductor light-emitting elements (LED) 22 are attached also onto the outer circumferential surface of the cylindrical board 21. Namely, the configuration capable of irradiating illumination light sideward as well as downward is illustrated. Note that, in this example, the optical unit 30 is arranged so as to be located at a substantially center portion of the downward illumination light flux. Note that the optical unit 30 is not necessarily arranged at the substantially center portion of the illumination light flux of the downward illumination light. The optical unit 30 maybe arranged on the end side of the illumination light flux of the downward illumination light, that is, near the side surface of the cylinder.

Also, a diffusing panel 12 (side diffusing panel) is attached also to the outer circumference of the housing 11 in addition to the diffusing panel 12 (lower diffusing panel) of an opening plane of the lower surface of the housing 11. With this configuration, it is possible to irradiate the illumination light also in a sideward direction of the illumination device 10 equipped with an image projection function (wide-range illumination function) in addition to the effect of the vertical orientation of the optical unit.

In the example of FIGS. 14(A) and 14(B), the illumination function having the plurality of different irradiation directions is provided like in the example of FIGS. 13(A) and 13(B), and thus the switching control for a plurality of modes with respect to the illumination light of the illumination function in the plurality of irradiation directions and the projection image of the image projection function may be performed as described in FIGS. 13(A) and 13(B).

In an example of FIGS. 15(A) and 15(B), the board 21 for the illumination light source 20 is formed to have a cylindrical shape by extending the end portion thereof in the perpendicular direction and to have a flange portion by further extending the end portion in the horizontal direction. Also, a plurality of semiconductor light-emitting elements (LED) 22 are attached to upper and lower surfaces of the board 21, the outer circumferential surface of the cylindrical portion, and the lower surface of the flange portion.

Note that the optical unit 30 is not necessarily arranged at a substantially center portion of the illumination light flux of downward illumination light. The optical unit 30 may be arranged on the end side of the illumination light flux of the downward illumination light, that is, near the side surface of the cylinder. Also, an opening is formed so as to cover the upper surface and a part of the outer circumference (upper portion) of the housing (shade) 11 and a diffusing panel 12 (upper circumferential diffusing panel) is attached to the opening in addition to the diffusing panel 12 (lower diffusing panel) of the lower surface of the housing (shade) 11. With this configuration, the illumination light can be uniformly irradiated to the circumference including the upper surface and the lateral side of the illumination device 10 equipped with an image projection function (wide-range illumination function) in addition to the effect of the vertical orientation of the optical unit.

In the example of FIGS. 15(A) and 15(B), the illumination function having the plurality of different irradiation directions is provided like in the example of FIGS. 13(A) and 13(B), and thus the switching control for a plurality of modes with respect to the illumination light of the illumination function in the plurality of irradiation directions and the projection image of the image projection function may be performed as described in FIGS. 13(A) and 13(B).

FIG. 16 illustrates a configuration in which a planar luminous body 121 such as electroluminescence (EL) is adopted instead of the board 21 for the illumination light source 20 including the plurality of semiconductor light-emitting elements (LED) 22 in the configuration of FIGS. 9(A) and 9(B) and the luminous body 121 is arranged at a lower end portion of the housing (shade) 11 (namely, at the position of the diffusing panel 12 of FIGS. 9(A) and 9(B)).

With this configuration, since the luminous body 121 covering the lower end portion of the housing (shade) 11 in which the optical unit 30 is housed irradiates illumination light, the optical unit 30 in the housing 11 is not recognized from the outside, and it is possible to more reliably suppress the degradation of the quality of appearance as an illumination device. Note that, although only the case in which the optical unit 30 is arranged to be located at an end portion of the downward illumination light flux has been illustrated in this example, the arrangement is not limited to this. Even when the optical unit 30 is arranged at a substantially center portion thereof or at an intermediate position therebetween, a similar effect can be achieved.

Also, although the luminous body 121 is provided so as to cover the lower end portion of the housing (shade) 11 in the example described above, a deep shade may be configured by extending a lower end portion of the side surface of the housing (shade) 11 in a downward direction below the luminous body 121.

Note that FIG. 16 corresponds to the case in which the plurality of semiconductor light-emitting elements (LED) 22 are removed from FIGS. 9(A) and 9(B) and the planar luminous body 121 is arranged at the portion of the diffusing panel 12. Based on the similar idea, it is also possible to remove the plurality of semiconductor light-emitting elements (LED) 22 and arrange the planar luminous body 121 at the portion of the diffusing panel 12 in the configuration example of FIGS. 13(A) and 13(B), FIGS. 14(A) and 14(B), or FIGS. 15(A) and 15(B). In this case, it is possible to realize an illumination device 10' equipped with an image projection function that includes the planar luminous body 121 as an illumination function and is capable of irradiating illumination light in a plurality of irradiation directions. Furthermore, since the illumination function having the plurality of different irradiation directions is provided like in the case of FIGS. 13(A) and 13(B), the switching control for a plurality of modes with respect to the illumination light of the illumination function in the plurality of irradiation directions and the projection image of the image projection function may be performed as described in FIGS. 13(A) and 13(B).

Furthermore, more specific layouts (arrangements) of the ceiling-type illumination device 10' equipped with the image projection function in which the optical unit (30) is provided in accordance with the vertical orientation layout described above will be described below with reference to FIGS. 17 to 19.

<Ceiling-Type Illumination Device Equipped with Image Projection Function>

First, FIGS. 17(A) and 17(B) are a side sectional view and a bottom view of the ceiling-type illumination device 10' equipped with an image projection function. In this example, the board 21 of the illumination light source 20 including the plurality of semiconductor light-emitting elements (LED) 22 is attached to an inner bottom surface of the housing (shade) 11 serving as a main body. Furthermore, the diffusing panel 12 is attached to the housing so as to cover an opening plane on the lower side of the figure. In addition, the optical unit 30 is arranged so as to be located at a substantially center portion of an illumination light flux in a space formed by the housing (shade) 11 and the diffusing panel 12.

With this layout (arrangement), since the optical unit 30 can be thinned in a direction parallel to the horizontal plane, the rate of the shadow formed by the optical unit 30 to the illuminated area on the diffusing panel 12 from the illumination light source 20 can be reduced. Accordingly, it is possible to suppress the degradation of the quality of appearance as an illumination device due to the influence of the shadow of the optical unit 30 formed above the diffusing panel 12 (namely, sense of discomfort as an illumination device due to the shadow on the diffusing panel 12). Even in the case where the housing (shade) 11 is formed of a diffusing panel, the shadow of the optical unit 30 is inconspicuous and it is possible to suppress the degradation of the quality of appearance as an illumination device.

FIGS. 18(A) and 18(B) are a side sectional view and a bottom view of the ceiling-type illumination device 10' equipped with an image projection function. In this example, the optical unit 30 attached inside the housing (shade) 11 is arranged so as to be located at an end portion of an illumination light flux.

Also, in the ceiling-type illumination device 10' equipped with an image projection function illustrated in FIGS. 19(A) and 19(B), the optical unit 30 is arranged at an intermediate position between the layout (arrangement) of FIGS. 17(A) and 17(B) and the layout (arrangement) of FIGS. 18(A) and 18(B). Note that, with this layout (arrangement), it is possible to suppress the degradation of the quality of appearance as an illumination device like in the cases described above.

Furthermore, in the configuration example of the ceiling-type illumination device 10' equipped with an image projection function illustrated in FIGS. 20(A) and 20(B), the board 21 for the illumination light source 20 is formed to have a cylindrical shape by extending the end portion thereof in the perpendicular direction, a plurality of semiconductor light-emitting elements (LED) 22 are attached onto the bottom surface thereof, and a plurality of semiconductor light-emitting elements (LED) 22 are attached also onto the outer circumferential surface of the cylindrical board 21. Namely, the configuration capable of irradiating illumination light sideward as well as downward is illustrated. Note that, in this example, the optical unit 30 is arranged so as to be located at a substantially center portion of the downward illumination light flux. Note that the optical unit 30 is not necessarily arranged at the substantially center portion of the illumination light flux of the downward illumination light. The optical unit 30 may be arranged on the end side of the illumination light flux of the downward illumination light, that is, near the side surface of the cylinder.

Also, a diffusing panel 12 (side diffusing panel) is attached also to the outer circumference of the housing 11 in addition to the diffusing panel 12 (lower diffusing panel) of an opening plane of the lower surface of the housing 11. With this configuration, it is possible to irradiate the illumination light also in a sideward direction of the illumination device 10 equipped with an image projection function (wide-range illumination function) in addition to the effect of the vertical orientation of the optical unit. With the configuration described above, it is possible to achieve the effect similar to that of the illumination device equipped with the image projection function of FIGS. 14(A) and 14(B) in the ceiling-type illumination device equipped with an image projection function.

In the example of FIGS. 20(A) and 20(B), the illumination function having the plurality of different irradiation directions is provided like in the example of FIGS. 13(A) and 13(B), and thus the switching control for a plurality of modes with respect to the illumination light of the illumination function in the plurality of irradiation directions and the projection image of the image projection function may be performed as described in FIGS. 13(A) and 13(B).

Furthermore, in the configuration example of the ceiling-type illumination device 10' equipped with an image projection function illustrated in FIG. 21, a planar luminous body 121 such as electroluminescence (EL) is adopted instead of the board 21 for the illumination light source 20 including the plurality of semiconductor light-emitting elements (LED) 22 in the configuration of FIGS. 18(A) and 18(B) and the luminous body 121 is arranged at the position of the diffusing panel 12 of FIGS. 18(A) and 18(B). With this configuration, since the luminous body 121 covering the lower end portion of the housing 11 in which the optical unit 30 is housed irradiates illumination light, the optical unit 30 in the housing 11 is not recognized from the outside, and it is possible to more reliably suppress the degradation of the quality of appearance as an illumination device.

Note that, although only the case in which the optical unit 30 is arranged to be located at an end portion of the downward illumination light flux has been illustrated in this example, the arrangement is not limited to this. Even when the optical unit 30 is arranged at a substantially center portion thereof or at an intermediate position therebetween, a similar effect can be achieved.

Note that FIG. 21 corresponds to the case in which the plurality of semiconductor light-emitting elements (LED) 22 are removed from FIGS. 18(A) and 18(B) and the planar luminous body 121 is arranged at the portion of the diffusing panel 12. Based on the similar idea, it is also possible to remove the plurality of semiconductor light-emitting elements (LED) 22 and arrange the planar luminous body 121 at the portion of the diffusing panel 12 in the configuration example of FIGS. 20(A) and 20(B), and further to divide the planar luminous body 121 into a downward irradiation region and a sideward irradiation region in accordance with the angle of the plane thereof.

In this case, if the light emission in the downward irradiation region and the light emission in the sideward irradiation region of the planar luminous body 121 are made to be individually controllable, it is possible to realize an illumination device 10' equipped with an image projection function that includes the planar luminous body 121 as an illumination function and is capable of irradiating illumination light in a plurality of irradiation directions. Furthermore, since the illumination function having the plurality of different irradiation directions is provided like in the case of FIGS. 13(A) and 13(B), the switching control for a plurality of modes with respect to the illumination light of the illumination function in the plurality of irradiation directions and the projection image of the image projection function may be performed as described in FIGS. 13(A) and 13(B).

In the foregoing, the illumination devices having the image projection function according to the various embodiments of the present invention have been described. However, the present invention is not limited to the embodiments described above, and includes various modification examples. For example, the entire system has been described in detail in each of the embodiments in order to clearly describe the present invention, and the present invention is not necessarily limited to the embodiment including all the configurations described above. Also, a part of the configuration of one embodiment may be replaced with the configuration of another embodiment, and the configuration of one embodiment may be added to the configuration of another embodiment. Furthermore, another configuration may be added to a part of the configuration of each embodiment, and a part of the configuration of each embodiment may be eliminated or replaced with another configuration.

REFERENCE SIGNS LIST 10 illumination device
11 main body (housing) (shade)
12 diffusing panel
20 illumination light source
22 semiconductor light-emitting element (LED)
30 optical unit
31 light source
32 display unit
34 projection optical system

The invention claimed is:

1. An illumination apparatus configured to emit illumination light, the illumination apparatus comprising:
   a light source arranged inside a housing and generating the illumination light;
   a diffusing panel diffusing the illumination light from the light source; and
   a projector which includes a projection lens and is arranged inside a space formed by the housing and a part of the diffusing panel and projecting an image onto a projection surface,
   wherein an optical unit constituting the projector is arranged in a state where an incident direction of a light flux incident from a display element provided in the projector onto a projection optical system of the projector is a substantially vertical direction or a direction closer to a vertical direction than a direction parallel to a horizontal plane, or in a state where an optical axis of the projection optical system on which the light flux from the display element provided in the projector is incident is a substantially vertical direction or a direction closer to the vertical direction than the direction parallel to the horizontal plane, and wherein the projector is located horizontally offset from a center of the diffusing panel, and the projector is configured to shift projection of the image in a direction toward a center of the illumination light on the projection surface.

2. The illumination apparatus according to claim 1, wherein the projector is configured to project the image onto the horizontal plane as the projection surface, and an image projection region of the projector on the horizontal plane and an illumination range on the horizontal plane of the illumination light obtained by diffusing the light generated by the light source are at least partially overlapped.

3. The illumination apparatus according to claim 1, further comprising:
an aperture or a transmissive window, through which projection image light from the optical unit is emitted from the inside of the space, is formed by the housing and a part of the diffusing panel,
wherein, in an arrangement in the vertical direction, an emission position of image projection light from the optical unit is arranged between the light source and the aperture or the transmissive window.

4. The illumination apparatus according to claim 1, wherein the illumination apparatus is a pendant-type illumination apparatus.

5. The illumination apparatus according to claim 1, wherein the illumination apparatus is a ceiling-type illumination apparatus.

6. The illumination apparatus according to claim 1, wherein the light source includes a light-emitting element arranged and attached on a lower surface of a board attached to a part of the housing.

7. The illumination apparatus according to claim 6, wherein the board includes a side surface extending further from an end portion of the board in a perpendicular direction, and
the light-emitting element is provided on an outer side of the side surface.

8. The illumination apparatus according to claim 1, wherein the light source includes a plurality of light-emitting elements arranged and attached on a lower surface and an upper surface of a board attached to a part of the housing.

9. The illumination apparatus according to claim 1, wherein the diffusing panel is used as the light source that generates the illumination light.

10. The illumination apparatus according to claim 9, wherein the light source that generates the illumination light is configured by an electroluminescent body.

11. The illumination apparatus according to claim 1, wherein the light source that generates the illumination light is configured by a light emitting diode.

12. The illumination apparatus according to claim 1, wherein the optical axis of the projection optical system of the projector is located horizontally offset from a center of the display element in the projector.

* * * * *